United States Patent [19]

Takei et al.

[11] Patent Number: 4,559,161

[45] Date of Patent: Dec. 17, 1985

[54] LIQUID CRYSTAL COMPOSITION

[75] Inventors: Katsumori Takei; Haruo Nakamura, both of Suwa, Japan

[73] Assignee: Kabushiki Kaisha Suwa Seikosha, Nagano, Japan

[21] Appl. No.: 466,989

[22] Filed: Feb. 16, 1983

[30] Foreign Application Priority Data

Feb. 18, 1982 [JP] Japan ................................. 57-24904
Feb. 18, 1982 [JP] Japan ................................. 57-24907

[51] Int. Cl.$^4$ ............................ C09K 3/34; G02F 1/13
[52] U.S. Cl. ........................... 252/299.63; 252/299.64; 252/299.65; 252/299.66; 252/299.01; 350/350 R; 350/346
[58] Field of Search ...................... 252/299.63, 299.64, 252/299.65, 299.66, 299.01; 350/350 R, 346

[56] References Cited

U.S. PATENT DOCUMENTS

| | | | |
|---|---|---|---|
| 3,953,491 | 4/1976 | Steinstrasser et al. | 252/299.64 X |
| 3,975,286 | 8/1976 | Oh | 252/299.66 X |
| 4,009,934 | 3/1977 | Goodwin et al. | 252/299.62 X |
| 4,082,428 | 4/1978 | Hsu | 252/299.01 X |
| 4,130,502 | 12/1978 | Eidenschink et al. | 252/299.63 |
| 4,195,916 | 4/1980 | Coates et al. | 252/299.01 X |
| 4,198,312 | 4/1980 | Sato et al. | 252/299.63 |
| 4,229,315 | 10/1980 | Krause et al. | 252/299.63 |
| 4,237,026 | 12/1980 | Eidenschink et al. | 252/299.63 |
| 4,261,651 | 4/1981 | Gray et al. | 252/299.63 |
| 4,279,770 | 7/1981 | Inukai et al. | 252/299.63 |
| 4,368,135 | 1/1983 | Osman | 252/299.63 |
| 4,400,293 | 8/1983 | Romer et al. | 252/299.63 |
| 4,405,488 | 9/1983 | Sugimori et al. | 252/299.66 X |

FOREIGN PATENT DOCUMENTS

| | | | |
|---|---|---|---|
| 84194 | 7/1983 | European Pat. Off. | 252/299.63 |
| 2939782 | 4/1981 | Fed. Rep. of Germany | 252/299.61 |
| 54-152684 | 12/1979 | Japan | 252/299.63 |
| 55-66556 | 5/1980 | Japan | 252/299.63 |
| 55-84385 | 6/1980 | Japan | 252/299.64 |
| 57-7457 | 1/1982 | Japan | 252/299.64 |
| 57-5780 | 1/1982 | Japan | 252/299.63 |
| 57-5781 | 1/1982 | Japan | 252/299.63 |
| 57-5782 | 1/1982 | Japan | 252/299.63 |
| 57-34176 | 2/1982 | Japan | 252/299.63 |
| 57-40229 | 3/1982 | Japan | . |
| 57-109884 | 7/1982 | Japan | 252/299.67 |
| 57-117579 | 7/1982 | Japan | 252/299.67 |
| 57-154158 | 9/1982 | Japan | 252/299.63 |
| 58-29877 | 2/1983 | Japan | 252/299.63 |
| 58-121266 | 7/1983 | Japan | 252/299.63 |
| 2077286 | 12/1981 | United Kingdom | 252/299.63 |
| 8200654 | 3/1982 | U.S.S.R. | 252/299.5 |

OTHER PUBLICATIONS

Van Meter et al., "Dielectric Properties . . . ", 1975, vol. 16, pp. 315-318, Solid State Communications.
Gray et al., "New Cholesteric Liquid Crystals . . . ", Electronics Letters, Dec. 27, 1973, vol. 9, No. 26, pp. 616-617.

Primary Examiner—Teddy S. Gron
Assistant Examiner—Catherine S. Kilby
Attorney, Agent, or Firm—Blum Kaplan Friedman Silberman & Beran

[57] ABSTRACT

An improved liquid crystal composition for use in a liquid crystal light valve is provided. The light valve includes a liquid crystal panel having two opposed transparent substrates with transparent electrodes disposed on the inner surfaces thereof with the liquid crystal material disposed between the substrates. The liquid crystal panel controls light transmittance in response to signals of higher frequency $h_f$ and lower frequency $h_l$ than a crossing frequency $f_c$ (wherein the dielectric anisotropy is zero) applied to the liquid crystal material, respectively or simultaneously. The improved liquid crystal composition includes the following compounds in the weight percent concentrations as indicated:

| compound | weight percentage (wt %) |
|---|---|
| (1)  | 40-60 |

(Abstract continued on next page.)

| compound | weight percentage (wt %) |
|---|---|
| (2) 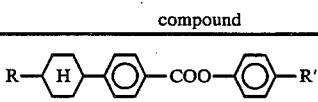 | 0–20 |
| (3) 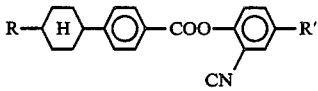 | 0–20 |
| (4) 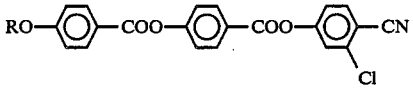 | 5–20 |
| (5) 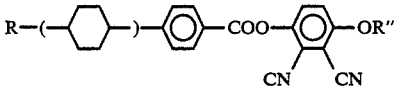 | 5–15 |
| (6) chiral nematic liquid crystal | 0.05–5 |
wherein,
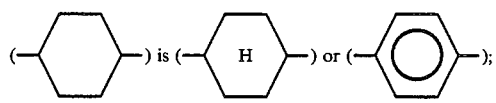
when 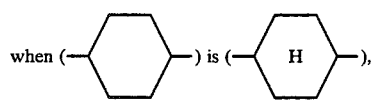,
R″ is R′ or —OCR′ and when
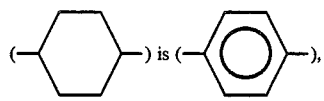
R″ is —OCR′, and each R and R′ is a straight chain alkyl group having from one to eight carbon atoms.
9 Claims, 9 Drawing Figures

FIG. 1
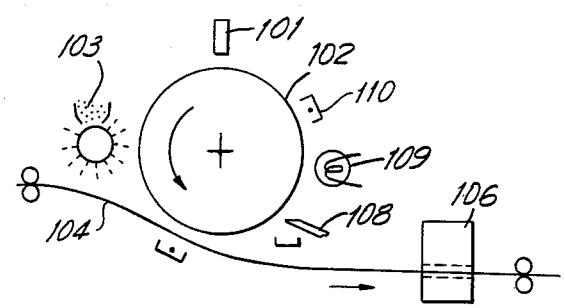
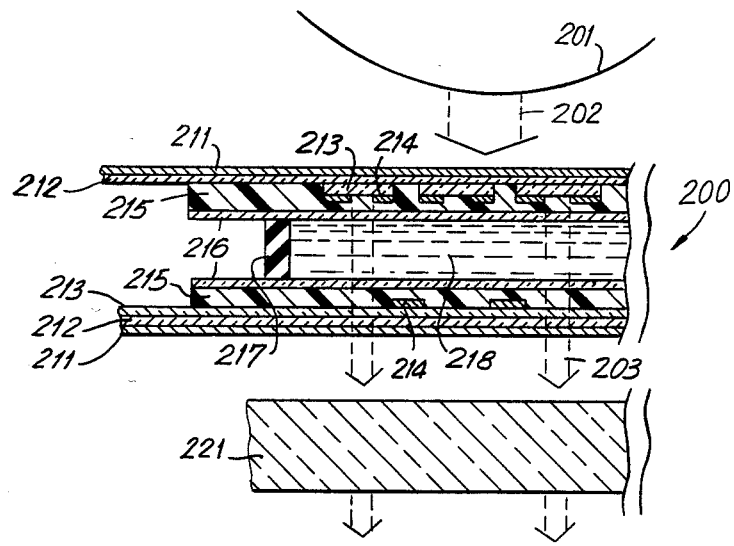
FIG. 2

FIG. 3
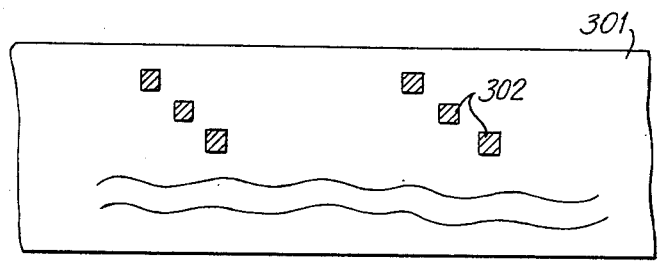
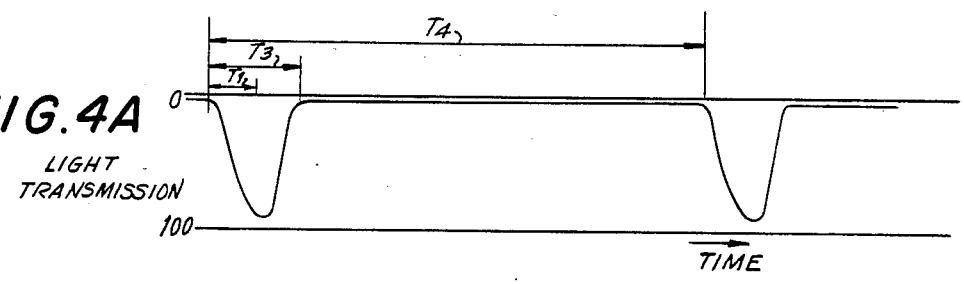
FIG. 4A
LIGHT TRANSMISSION
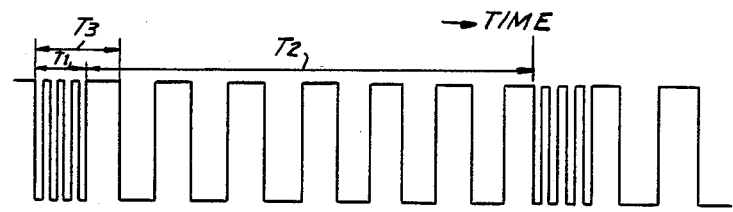
FIG. 4B
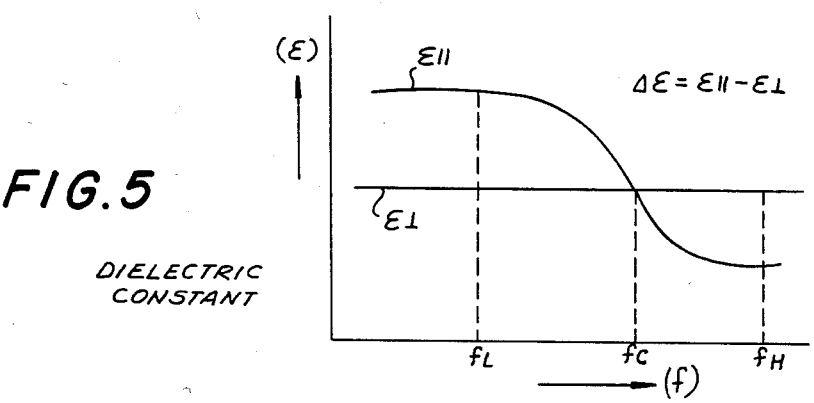
FIG. 5
DIELECTRIC CONSTANT

DIELECTRIC ANISOTROPY

DIELECTRIC CONSTANT

LIGHT TRANSMITTANCE

LIQUID CRYSTAL COMPOSITION

BACKGROUND OF THE INVENTION

This invention relates to a liquid crystal composition and more particularly to a liquid crystal composition for use in a liquid crystal light valve which operates in optical ON-OFF control in response to signals applied to the liquid crystal composition sealed in a liquid crystal panel, the signals being of a lower frequency $f_l$ and a higher frequency $f_h$ than the crossing or critical frequency $f_c$ wherein the dielectric anisotropy of the liquid crystal is 0. The invention also relates to a liquid crystal light valve including the novel liquid crystal composition having high-speed response characteristics which permit the liquid crystal panel to respond optically at high speeds.

In recent years, information processing techniques have made remarkable progress to the point where large amounts of information are processed at high speeds. Office automation equipment has become widely popularized. In view of these advancing techniques, the printer utilized as an output of a computer must function at high speed and provide a high quality level of printing at modest cost. Unfortunately, printers which satisfy these requirements are not generally available in spite of the strong demand for these products. Presently, an electro-photographic printer in which a liquid crystal light valve is positioned at a light signal generator meets some of the above-mentioned requirements on a practical level and is of interest in the field. Such a printer is disclosed in Japanese Laid-Open Patent Publication No. 81-93,568.

A laser printer which utilizes electro-photographic technology is also presently in use as a non-impact printing method. The preferred properties of such a printer, such as high quality printing and high printing speed are achieved by printers of this kind. However, due to their large size and complexity, these printers necessarily suffer from high manufacturing cost. Accordingly, an inexpensive printer of high quality is desired as an output and such printers utilizing liquid crystal light valves are under consideration.

While liquid crystal compositions for use in liquid crystal display devices have been thoroughly researched and developed, it has been found that those compositions are less than completely satisfactory for a liquid crystal light valve. The conventional liquid crystal compositions are not suitable for use in a liquid crystal light valve with respect to, for example the driving voltage, the liquid crystal phase temperature and reliability.

Accordingly, it is desirable to provide a liquid crystal composition suitable for use in a liquid crystal light valve in an electro-photographic printer having improved response speed, does not exhibit temperature dependency and is highly reliable.

SUMMARY OF THE INVENTION

Generally speaking, in accordance with the invention, an improved liquid crystal composition for use in a liquid crystal light valve including a liquid crystal panel is provided. The liquid crystal panel is formed from two opposed transparent substrates with transparent electrodes disposed on the inner surfaces thereof with a liquid crystal material disposed in the space between the opposed transparent substrates. The liquid crystal light valve controls light transmittance in response to signals applied to the liquid crystal material. The applied signals are of a higher frequency $h_f$ and a lower frequency $f_l$ than a crossing frequency $f_c$ of the liquid crystal material. The crossing frequency or critical frequency, $f_c$, is the frequency at which the dielectric anisotropy of the liquid crystal material is 0.

The improved liquid crystal compositions for use in the liquid crystal light valve is obtained by mixing the following compounds in weight percentages as shown in the following table:

| compound | weight percentage (wt %) |
|---|---|
| (1) 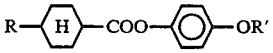 | 40–60 |
| (2) 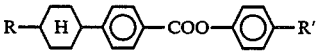 | 0–20 |
| (3) 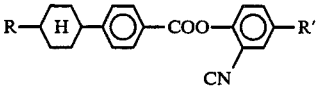 | 0–20 |
| (4) 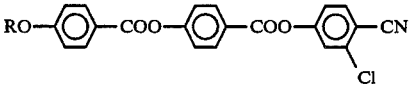 | 5–20 |
| (5) 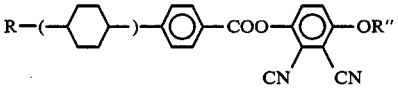 | 5–15 |
| (6) chiral nematic liquid crystal | 0.05–5 | wherein,

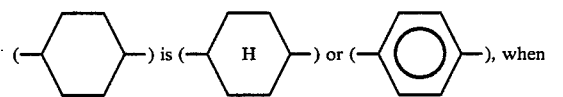

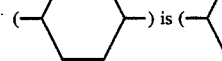

and R" is R' or —OCR' and when

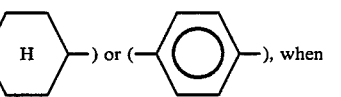

R" is —OCR' and each R and R' is a straight chain alkyl group having from one to eight carbon atoms.

Accordingly, it is an object of the invention to provide an improved liquid crystal composition.

It is a further object of the invention to provide an improved liquid crystal composition for use in a light valve.

It is another object of the invention to provide an improved liquid crystal composition for use in a light valve at a light generating portion of an electro-photographic printer.

Still another object of the invention is to provide a liquid crystal composition for use in a liquid crystal light valve having improved response speed.

Still a further object of the invention is to provide an improved liquid crystal composition for use in a liquid crystal light valve which does not exhibit temperature dependency.

Yet another object of the invention is to provide an improved liquid crystal device including the improved liquid crystal composition of the invention.

Yet a further object of the invention is to provide an improved liquid crystal light valve for an electro-photographic printer.

Still other objects and advantages of the invention will in part be obvious and will in part be apparent from the specification.

The invention accordingly comprises the features of construction, combination of elements, and arrangement of parts which will be exemplified in the construction hereinafter set forth and in a composition of matter possessing the characteristics, properties, and the relation of constitutents which will be exemplified in the composition hereinafter described, and the scope of the invention will be indicated in the claims.

BRIEF DESCRIPTION OF THE DRAWINGS

For a fuller understanding of the invention, reference is had to the following description taken in connection with the accompanying drawing, in which:

FIG. 1 is a schematic representation of an electrophotographic printer using a liquid crystal light valve;

FIG. 2 is a schematic view in cross-section of the liquid crystal light valve utilized in the electro-photographic printer of FIG. 1;

FIG. 3 is a top plan view of a liquid crystal panel utilized in a liquid crystal light valve of the type illustrated in FIG. 2;

FIG. 4(a) is a graph illustrating the light transmittance characteristics of the liquid crystal light valve; and FIG. 4(b) illustrates the signal applied to the liquid crystal light valve.

FIG. 5 is a graphical representation of the frequency dependence characteristics of the dielectric constant of the liquid crystal material prepared in accordance with the invention;

DESCRIPTION OF THE PREFERRED EMBODIMENTS

Figure 6:
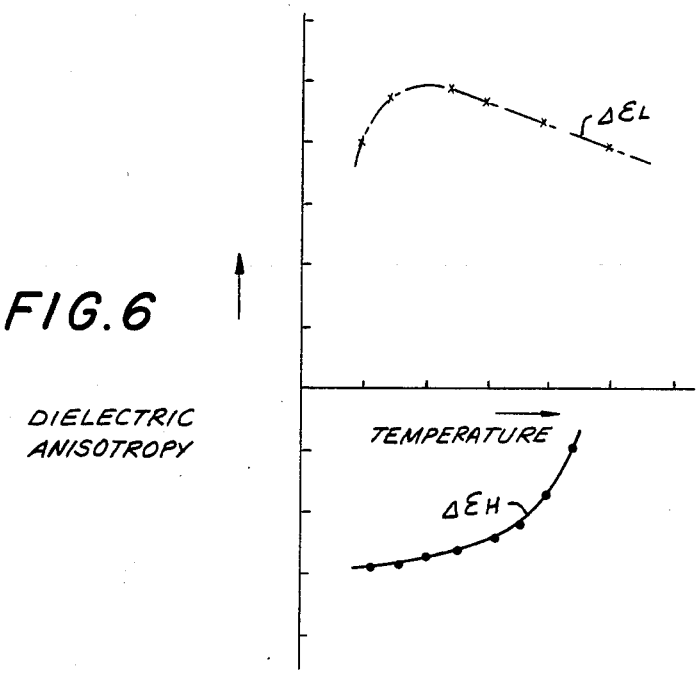
FIG. 6 is a graph illustrating the dielectric anisotropy—temperature characteristics of the liquid crystal compositions prepared in accordance with the invention.

FIG. 1 illustrates in schematic the structure of an electro-photographic printer 100 using a liquid crystal light valve 200 of the type illustrated in FIG. 2. Latent images are light-written on a photosensitive drum 102 by means of light generated in a light signal generator 101 which includes liquid crystal light valve 200. Photosensitive drum 102 is initially charged by a corona charger 110. A light signal 200 generated by light signal generator 101 corresponds to the position of characters to light-written. The electrostatic latent image is formed on drum 102 and is developed with toner by means of a magnetic brush developing device 103. Such developing usually provides a reverse image on drum 102. The toner image is then transferred onto a paper or other recording medium 104 by means of a transferring corona discharge device 105 and is then fixed by means of a fixer 106. The toner image or any residual toner on photosensitive drum 102 after transferring the image to paper 104 is eliminated by a blade 108. The electrostatic latent image is static-eliminated by a static eliminating lamp 109.

FIG. 2 illustrates the structure of light signal generating section 101 including light valve 200 in detail. Light generated by a light source 201 is modulated selectively by ON-OFF control through a liquid crystal panel 210. Light 203 transmitted through liquid crystal panel 210 is focused through an image lens 221 and imaged on photosensitive drum 102. Liquid crystal panel 210 includes two opposed transparent substrates 212 with transparent electrodes 213 disposed on the interior surfaces of substrates 212. Transparent electrodes 213 may be NESA electrodes which are formed by photo-etching after a thin film is coated on transparent substrates 212 by sputtering, evaporation or deposition. A plurality of metallic thin films 214 are used as the optical masks for light signal generator 101. An insulating film 215 is disposed on each film 214 and a liquid crystal orientation film 216 is disposed on each film 215. A spacer 217 maintains transparent substrates 212 apart from each other and encapsulates a liquid crystal composition 218 sealed between respective transparent substrates 212. A pair of outer polarizing plates 211 are disposed on the outer surfaces of transparent substrates 212.

FIG. 3 illustrates in plan view an optical mask 301 including liquid crystal panels 210 of the type illustrated in FIG. 2. Optical mask 301 includes a plurality of micro-shutter arrays 302 which control the transmittance and cut-off of light generated by light source 201.

The general principles concerned with operating a liquid crystal light valve will be described with reference to FIGS. 4 and 5. Liquid crystal light valve 200 is driven in a multiplex driving mode. FIG. 4(b) illustrates the signal which is applied to liquid crystal panel 210 in liquid crystal light valve 200. FIG. 4(a) illustrates the light transmittance properties of light valve 200 in response to the applied signal. When a signal $f_h$ of higher frequency than $f_c$ is applied for an opening time portion $T_1$ of a writing period $T_4$, light passes through liquid crystal light valve 200. When a signal $f_l$ of a lower frequency than $f_c$ is applied for an unopened time portion $T_2$ of writing period $T_4$, light is cut-off by liquid crystal light valve 200. $T_3$ is a selecting period and the drive duty in this illustration is $T_3/T_4$.

It is generally known to those skilled in the art that the orientation of the liquid crystal molecules in the liquid crystal panel can be controlled by the frequency of the signals applied thereto. This is due to the property of the liquid crystal material that the sign of the dielectric anisotropy of the liquid crystal material reverses, depending on the frequency of the signal applied thereto. FIG. 5 illustrates this effect and shows the frequency dependence of the dielectric constant of liquid crystal material of the type prepared in accordance with the present invention. The notation represents the dielectric constant in the lengthwise direction of the molecule, and represents the dielectric constant in the transverse direction or across the width of the liquid crystal molecule. The liquid crystal material utilized in accordance with the invention is characterized by a crossing or critical frequency $f_c$, at which the dielectric constants are equal as expressed by the formula $\epsilon_\| = \epsilon_\perp$. In other words, the dielectric anisotropy is defined as $\Delta\epsilon = \epsilon_\| - \epsilon_\perp = 0$.

In order to achieve high response speed, high quality printing and highly reliable printing from a printer utilizing a liquid crystal light valve as described above at a light writing station, it is necessary to overcome some difficulties encountered by conventional liquid crystal compositions. Most important, the light energy supplied to the photo-sensitive drum during a selecting period ($T_3$ in FIG. 4) must be high. To meet this requirement, the characteristics of the printer can be improved to a certain degree by moderating a light source optically or by changing the driving method by the liquid crystal panel. However, as a matter of fact, an improvement of the basic characteristics of the liquid crystal composition will contribute the most in order to satisfy the above-mentioned requirement.

The desirable characteristics of a liquid crystal composition for a liquid crystal light valve of high quality are as follows:

1. To respond quickly at low applied voltage;
2. To keep high-speed response over a wide range of temperature and applied voltages; and
3. To maintain high reliability.

Improved liquid crystal materials for use in two-frequency driving methods have been developed in applications for display devices and the like. However, when such materials are utilized in a printer, they are found not to have sufficiently high-speed response characteristics (less than a few milli-seconds) in order to satisfy the above-mentioned requirements. In view of the shortcoming of the conventionally available liquid crystal compositions, it is a primary object of the invention to provide an improved liquid crystal material for use in a liquid crystal light valve in a printer. Most importantly, it is desired to provide a liquid crystal material for use in a two-frequency driving method which satisfies the three requirements described above. These will be described in detail as follows:

1. To respond quickly at low applied voltages.

Integrated circuits are used in the driving circuits in order to reduce the size of the devices and their manufacturing costs. Such circuits respond to driving voltages and driving frequencies which are not too high. Accordingly, a liquid crystal composition in such a device must be driven at low voltages and at low frequencies in order to reduce energy consumption.

The response speed of a liquid crystal material $\tau$ is inversely proportional to the square roots of the dielectric anisotropy in accordance with the following relationship:

$$\tau \propto \frac{\eta}{v} \cdot \sqrt{\frac{K}{\Delta\epsilon}}$$

wherein $\tau$ is the speed of response, $\eta$ is the viscosity, $v$ is the applied voltage and $\kappa$ is a constant. The speed of response is the response time from voltage onset to the liquid crystal to the time when light transmittance through the liquid crystal has reacted 90 percent. In accordance with this relationship, in order to achieve high response speed the absolute value of the dielectric anisotropy at a driving frequency must be large and the viscosity of the material must be low. Furthermore, a crossing frequency $f_c$ at room temperature should be lowered to a desired level, because the driving frequency is relatively low as mentioned above. As liquid crystal materials formed of a single component do not satisfy all of the above-noted conditions, several components should be admixed in order to satisfy each of them.

First, a liquid crystal composition having a low crossing frequency $f_c$ and a low viscosity are generally inconsistent with each other. Among those components of a liquid crystal composition in accordance with the invention which keep both the crossing frequency $f_c$ and the viscosity low are liquid crystal compounds represented by the following formulas:

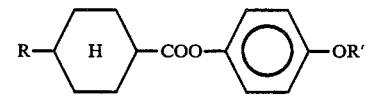

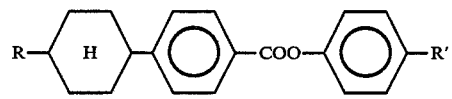

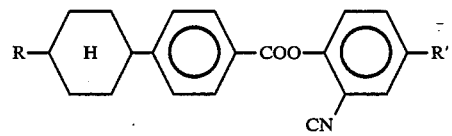

wherein R and R' are each a straight chain alkyl group having from one to eight carbon atoms.

Second, the liquid crystal composition in accordance with the invention must include a liquid crystal to control the dielectric anisotropy in both the low and high frequency ranges. While there are many conventional liquid crystal materials or compounds having the molecular structure of which is similar to that of a liquid crystal material having a large absolute value of positive dielectric anisotropy, there are only a small number of those having a large absolute value of negative dielectric anisotropy. Furthermore, there are only a few which satisfy the other requirement such as having small fusion entropy and having a wide range of liquid crystal phase temperature while not having an adverse effect on the crossing frequency $f_c$ and the viscosity. Applicants have discovered that a liquid crystal compound suitable for use in the liquid crystal composition in accordance with the invention which has a very large positive dielectric anisotropy than a crossing frequency $f_c$ which is rather low. This compound may be represented by the following formula (4):

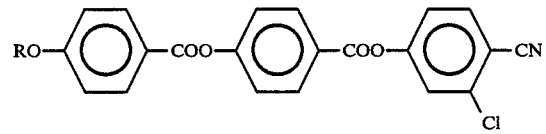

wherein R is a straight chain alkyl group having from one to eight carbon atoms.

An additional liquid crystal compound having a high absolute value of negative dielectric anisotropy is included in the liquid crystal composition in accordance with the invention. This compound may be represented by the following formula (5):

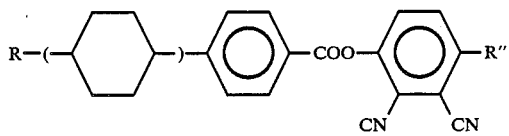

wherein,

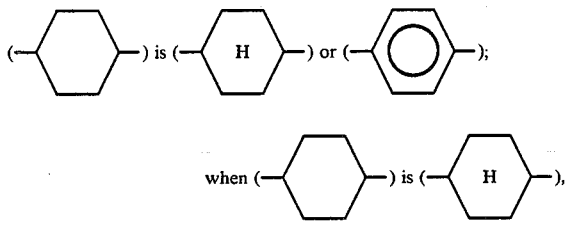

R" is R' or —OCR' and when

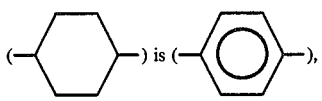

R" is —OCR' and each R and R' is a straight chain alkyl group having from one to eight carbon atoms. Compound (5) has excellent solubility with the other components of the composition.

Finally, the liquid crystal composition in accordance with the invention includes a chiral nematic liquid crystal compound admixed therein. It is well known that addition of a relatively small amount of a chiral nematic liquid crystal compound to a liquid crystal composition does not provide any opposing tilts the liquid crystal material in a twisted nematic liquid crystal display panel. Moreover, such addition generally results in an improved contrast for a guest-host liquid crystal display panel. Additionally, a liquid crystal material to which a chiral nematic liquid crystal compound is added may be driven by other driving methods which make use of the memory effect. It is also known to those skilled in the art that high-speed response of a liquid crystal material can be achieved by utilizing the helical force of a chiral nematic liquid crystal compound. In other words, the force will place the orientation within the liquid crystal material in a spiral configuration.

In accordance with the invention a chiral nematic liquid crystal compound is admixed with the liquid crystal composition in order to obtain high-speed response of the liquid crystal materials utilized in a liquid crystal display device driven by the two-frequency driving method. In the two-frequency driving method, the effect of the chiral nematic liquid crystal compound is to improve the response speed of the liquid crystal material. This is particularly remarkable when signals $f_h$ of a higher frequency than the crossing frequency $f_c$ is applied to the liquid crystal material, whereby the liquid crystal molecules are aligned parallel to the surfaces of the substrates.

It has been relatively difficult to increase the absolute value of $\Delta\epsilon H$ for conventional liquid crystal compositions due to the need to balance the other characteristics. Therefore, attempts have been directed to increase the absolute value of the dielectric anistropy of the liquid crystal material when a signal $f_l$ of lower frequency than crossing frequency $f_c$ is applied to the composition, referred to as $\Delta\epsilon L$, and if the dielectric anistropy when a signal $f_l$ of higher frequency than crossing frequency $f_c$ is applied, referred to as $\Delta\epsilon H$. The absolute values are increased by adding the appropriate amounts of the compounds described above.

It has also been discovered that the response speed of a liquid crystal material at room temperature and at the applied voltages surprisingly increase by adding an effective amount of a chiral nematic liquid crystal to the liquid crystal composition. In a liquid crystal composition as opposed to a single compound, interaction between the compounds of different types is generally expected to have some effect on the viscosity, the crossing frequency $f_c$ and the response speed of the liquid crystal material. In accordance with the invention, such interaction appears to be responsible for improving the characteristics of the liquid crystal composition. Applicants have not studied the principle of this interaction and such should be left to further studies in connection with the physics and quantum mechanics of the compositions.

2. The compositions must respond at high speeds over a wide range of temperatures and applied voltages.

FIG. 6 illustrates the temperature dependency of the dielectric anisotropy of a liquid crystal material in accordance with the invention. $\Delta\epsilon L$ is the dielectric anisotropy in the range of low driving frequency and $\Delta\epsilon H$ is the dielectric anisotropy in the range of a high driving frequency. As shown by FIG. 6, the absolute value of $\Delta\epsilon H$ decreases sharply as the temperature increases. In a practical application using any liquid crystal materials, the range of the liquid crystal phase temperature in which the change of $\Delta\epsilon H$ is small is generally chosen. However, a liquid crystal material of the type prepared in accordance with the invention should have low viscosity at relatively high temperature so as to obtain high-speed response of the liquid crystal material. Thus, a liquid crystal composition should present high-speed responses over a wide range of temperatures and applied voltages. In order to keep the high-speed response over a wide range of temperatures and voltages, keeping in mind that the variation of $\Delta\epsilon H$ is due inevitably to the change of temperature, the liquid crystal composition must have excellent light transmittance characteristics. In other words, the response of the liquid crystal material at a constant voltage is fast and the light transmittance curve remains saturated. This condition is satisfied on the assumption that the above-mentioned requirement (1) is satisfied, namely that the highspeed response at low voltage is achieved. This same principle can be applied over a range of voltages.

3. The composition must provide high reliability.

Studies and experiments of the liquid crystal compositions prepared in accordance with the invention have been made to provide chemical, optical and electrochemical stability. The compositions have high optical reliability because the compounds utilized in the composition all belong to the ester family. Furthermore, accelerated aging experiments demonstrate that the reliability of the composition prepared in accordance with the invention is sufficiently high for practical use.

It has been found that a superior liquid crystal composition satisfying each of the above three conditions may be provided by admixing the above-mentioned compounds in the following desired concentrations. The following Table 1 identifies the compounds and the weight percentages present in the compositions prepared in accordance with the invention.

| compound | weight percentage (wt %) |
|---|---|
| (1) 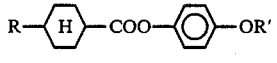 | 40–60 |
| (2) 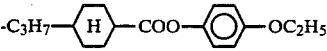 | 0–20 |
| (3) 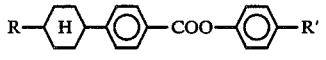 | 0–20 |
| (4)  | 5–20 |
| (5) 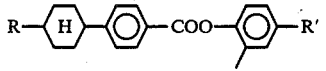 | 5–15 |
| (6) chiral nematic liquid crystal | 0.05–5 | wherein,

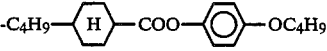 is (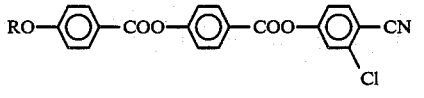) or (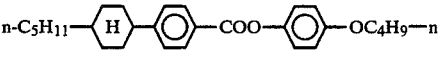), when

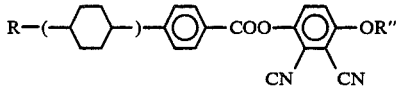 is (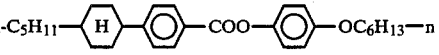)

and R" is R' or —CCR' and when

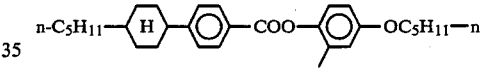 is (),

R" is —OCR' and each R and R' is a straight chain alkyl group having from one to eight carbon atoms.

Liquid crystal compositions prepared in accordance with the invention will now be described in greater detail with reference to the following examples. These examples are presented by way of illustration only, and not in a limiting sense. These compositions were prepared in order to examine the properties of the compositions and the light transmittance characteristics.

EXAMPLE 1

A liquid crystal composition in accordance with the invention was prepared by mixing the compounds listed in the following Table 2.

| compound | wt % |
|---|---|
|  | 10 |
|  | 10 |
| 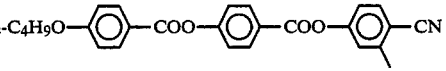 | 10 |
| 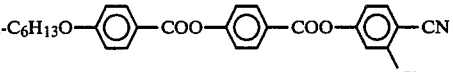 | 12 |
| 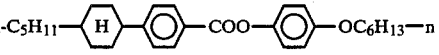 | 12 |
| 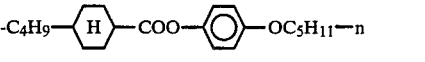 | 6 |
|  | 6 |
|  | 6 |
| n-C$_6$H$_{13}$O—◯—COO—◯—COO—◯—CN with Cl | 8 |
| n-C$_4$H$_9$O—◯—COO—◯—COO—◯—CN with Cl | 8 |
| n-C$_7$H$_{15}$—◯—◯—COO—◯—OOC C$_5$H$_{11}$—n with CN, CN | 3 |
| n-C$_3$H$_7$—H—◯—COO—◯—OOC C$_4$H$_9$—n with CN, CN | 3 |
| n-C$_3$H$_7$—H—◯—COO—◯—OOC C$_5$H$_{11}$—n with CN, CN | 4 |
| n-C$_6$H$_{13}$O—◯—COO—◯—COO—C$_8$H$_{17}$* | 2 |

C$_8$H$_{17}$* has the structural formula
—CH$_2$—ĊH—CH$_2$—CH$_2$—CH$_2$—CH$_2$—CH$_3$.
         |
         CH$_3$

EXAMPLE 2

The liquid crystal composition in accordance with the invention was prepared by mixing the compounds in the amounts listed in Table 3 as follows:

| compound | wt % |
|---|---|
| n-C$_3$H$_7$–(H)–COO–(⌬)–OC$_2$H$_5$ | 8 |
| n-C$_3$H$_7$–(H)–COO–(⌬)–OC$_4$H$_9$–n | 8 |
| n-C$_4$H$_9$–(H)–COO–(⌬)–OC$_2$H$_5$ | 10 |
| n-C$_5$H$_{11}$–(H)–COO–(⌬)–OCH$_3$ | 12 |
| n-C$_5$H$_{11}$–(H)–COO–(⌬)–OC$_2$H$_5$ | 12 |
| n-C$_5$H$_{11}$–(H)–(⌬)–COO–(⌬)–C$_5$H$_{11}$–n | 6 |
| n-C$_5$H$_{11}$–(H)–(⌬)–COO–(⌬)–C$_7$H$_{15}$–n | 6 |
| n-C$_3$H$_7$–(H)–(⌬)–COO–(⌬(CN))–C$_4$H$_9$–n | 10 |
| n-C$_6$H$_{13}$O–(⌬)–COO–(⌬)–COO–(⌬(Cl))–CN | 5 |
| n-C$_7$H$_{15}$O–(⌬)–COO–(⌬)–COO–(⌬(Cl))–CN | 5 |
| n-C$_8$H$_{17}$O–(⌬)–COO–(⌬)–COO–(⌬(Cl))–CN | 5.5 |
| n-C$_3$H$_7$–(H)–(⌬)–COO–(⌬(CN)(CN))–OC$_5$H$_{11}$–n | 5 |
| n-C$_5$H$_{11}$–(H)–(⌬)–COO–(⌬(CN)(CN))–OC$_5$H$_{11}$–n | 5 |
| n-C$_6$H$_{13}$O–(⌬)–COO–(⌬)–COO–C$_8$H$_{17}$* | 2.5 |

C$_8$H$_{17}$* has the structural formula

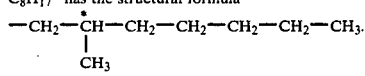

$$-CH_2-\overset{*}{CH}-CH_2-CH_2-CH_2-CH_2-CH_3$$
$$\quad\quad\quad|$$
$$\quad\quad CH_3$$

Figure 7:
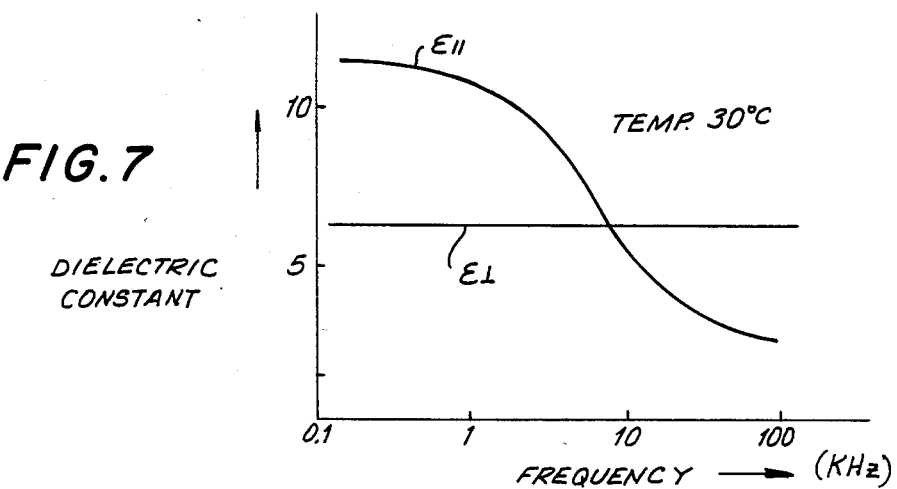
FIG. 7 is a graphical representation illustrating the frequency the dependence of the dielectric constant of a liquid crystal composition prepared in accordance with the invention.

FIG. 7 illustrates the frequency dependence of the dielectric constant of the liquid crystal compositions of Examples 1 and 2 at a temperature of 30° C. These liquid crystal compositions were encapsulated in an experimental liquid crystal display cell of 4.5 um in thickness and driven by a ½ dynamic driving method with low frequency signals (30 V, 1 kHz) and high frequency signals (30 V, 130 kHz) at 40° C. The rubbing angles on the interior surfaces of the substrates were disposed so that the axes of polarization were positioned at approximately 90° to each other.

Figure 8:
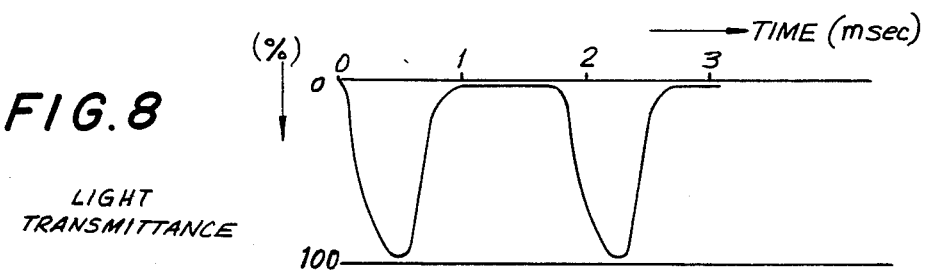
FIG. 8 is a graph illustrating the light transmittance characteristics of a liquid crystal light valve utilizing a liquid crystal composition prepared in accordance with the invention.

The like transmittance characteristics of the compositions of Examples 1 and 2 is illustrated in FIG. 8. Based on the results reported in FIG. 8, it can be seen that the same response of the liquid crystal composition is obtained with a period of between about 1.2 to 1.6 m sec. in the case of ½ dynamic driving method.

A printing device including a liquid crystal light valve utilizing the liquid crystal compositions of Examples 1 and 2 were prepared. The printing performance of the device utilizing the same liquid crystal cell was examined utilizing the same driving conditions as noted above. A high-luminance lamp including a fluorescent material having the following structural formula:

$$CeMgAl_{11}O_{19}:Tb^{3+}$$

as used as a light source. A photosensitive member formed from selenium whose sensitivity was intensified by doping tellurium was used. The respective elements were assembled in accordance with the schematic representation as illustrated in FIG. 1. The rotating speed of the surface of photosensitive drum 102 was maintained at 5 cm/sec. When the liquid crystal light valve was driven in accordance with the invention, clear images were light-written on photosensitive drum 102 corresponding to the ON-OFF control of light valve 200.

Use of the liquid crystal composition of Examples 1 and 2 in a liquid crystal light valve illustrate only one of the uses for such a composition prepared in accordance with the invention. In addition to printing devices, a liquid crystal light valve including a liquid crystal composition prepared in accordance with the invention can be utilized in a light-writing device other than a printing device, such as a display device and the like. It will thus be seen that liquid crystal compositions prepared in accordance with the invention are best suited for liquid crystal light valves which perform high-speed switching by utilizing the dielectric dispersion characteristics of the liquid crystal material and which are driven in the two-frequency driving method.

It will thus be seen that the objects set forth above, among those made apparent from the preceding description, are efficiently attained and, since certain changes may be made in the above construction and composition of matter without departing from the spirit and scope of the invention, it is intended that all matter contained in the above description or shown in the accompanying drawing shall be interpreted as illustrative and not in a limiting sense.

It is also to be understood that the following claims are intended to cover all of the generic and specific features of the invention herein described, and all statements of the scope of the invention which, as a matter of language, might be said to fail therebetween.

Particularly it is to be understood that in said claims, ingredients or compounds recited in the singular are intended to include compatible mixtures of such ingredients wherever the sense permits.

What is claimed is:

1. A liquid crystal composition, comprising at least one compound from each of the groups of compounds specified by each general formula below in the weight percent concentrations as indicated:

| compound | weight percentage (wt %) |
|---|---|
| (1) 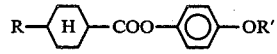 | 40-60 |
| (2) 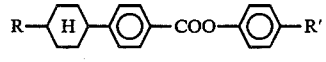 | 0-20 |
| (3)  | 0-20 |
| (4)  | 5-20 |
| (5) 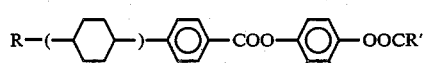 | 5-15 |
| (6) chiral nematic liquid crystal | 0.05-5 | wherein

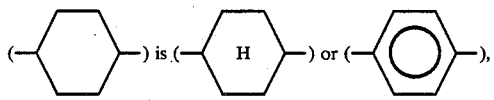

and each R and R' is a straight chain alkyl group having from one to eight carbon atoms.

2. The liquid crystal composition of claim 1, wherein R has from 3 to 7 carbon atoms and R' has from 2 to 6 carbon atoms.

3. The liquid crystal composition of claim 1, wherein the compounds of the formula of compound (1) are:

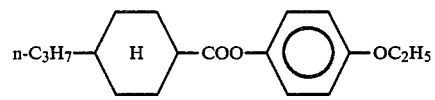

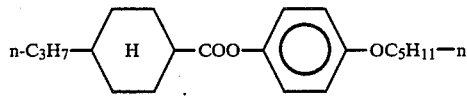

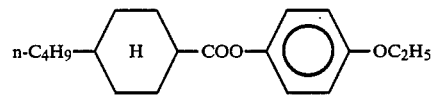

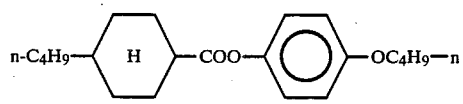

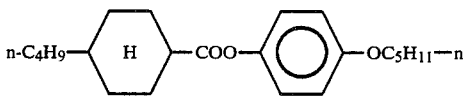

4. The liquid crystal composition of claim 1, wherein the compounds of the formula of compound (2) are:

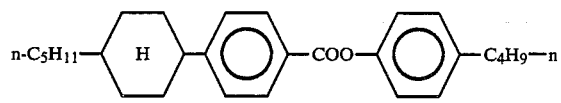

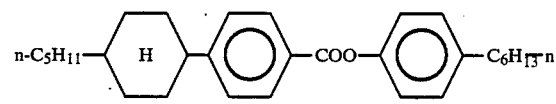

5. The liquid crystal composition of claim 1, wherein the compound of the formula of compound (3) is

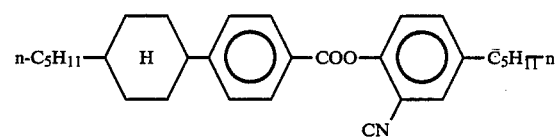

6. The liquid crystal composition of claim 1, wherein the compounds of the formula of compound (1) are:

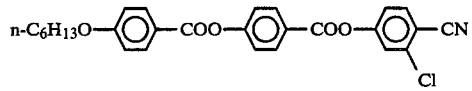

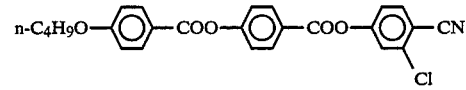

7. The liquid crystal composition of claim 1, wherein the compounds of the formula of compounds (5) are:

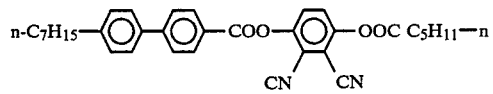

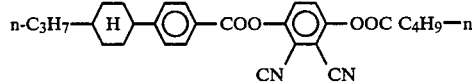

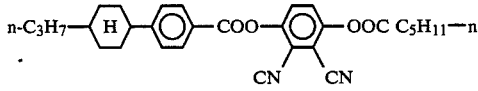

8. The liquid crystal composition of claim 1, wherein compound (6) is

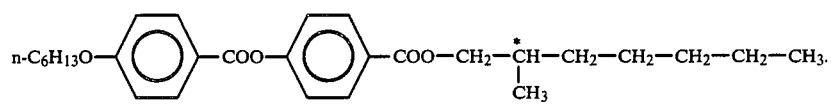

9. The liquid crystal composition of claim 1, comprising the following compounds and weight percentages:

| compound | wt % |
|---|---|
| n-C$_3$H$_7$–(H)–COO–(O)–OC$_2$H$_5$ | 10 |
| n-C$_3$H$_7$–(H)–COO–(O)–OC$_5$H$_{11}$–n | 10 |
| n-C$_4$H$_9$–(H)–COO–(O)–OC$_2$H$_5$ | 10 |
| n-C$_4$H$_9$–(H)–COO–(O)–OC$_4$H$_9$–n | 12 |
| n-C$_4$H$_9$–(H)–COO–(O)–OC$_5$H$_{11}$–n | 12 |
| n-C$_5$H$_{11}$–(H)–(O)–COO–(O)–C$_4$H$_9$–n | 6 |
| n-C$_5$H$_{11}$–(H)–(O)–COO–(O)–C$_6$H$_{13}$–n | 6 |

-continued

| compound | wt % |
|---|---|
| n-C$_5$H$_{11}$–(H)–(O)–COO–(O)(CN)–C$_5$H$_{11}$–n | 6 |
| n-C$_6$H$_{13}$O–(O)–COO–(O)–COO–(O)(Cl)–CN | 8 |
| n-C$_4$H$_9$O–(O)–COO–(O)–COO–(O)(Cl)–CN | 8 |
| n-C$_7$H$_{15}$–(O)–(O)–COO–(O)(CN,CN)–OOC C$_5$H$_{11}$–n | 3 |
| n-C$_3$H$_7$–(H)–(O)–COO–(O)(CN,CN)–OOC C$_4$H$_9$–n | 3 |
| n-C$_3$H$_7$–(H)–(O)–COO–(O)(CN,CN)–OOC C$_5$H$_{11}$–n | 4 |
| n-C$_6$H$_{13}$O–(O)–COO–(O)–COO–C$_8$H$_{17}$* | 2 | wherein "*" denotes optically active.

* * * * *